US006359052B1

(12) United States Patent
Trexler, Jr. et al.

(10) Patent No.: US 6,359,052 B1
(45) Date of Patent: Mar. 19, 2002

(54) POLYESTER/PLATELET PARTICLE COMPOSITIONS DISPLAYING IMPROVED DISPERSION

(76) Inventors: Jack Wesley Trexler, Jr., 1004 S. Page Pl., Kingsport, TN (US) 37660-7233; Rodney Layne Piner, 1301 Jackson Hollow Rd., Kingport, TN (US) 37663-3525; Sam Richard Turner, 1037 Sussex Pl., Kingsport, TN (US) 37660-5836; Robert Boyd Barbee, 500 Rambling Rd., Kingsport, TN (US) 37663-2131

(*) Notice: Subject to any disclaimer, the term of this patent is extended or adjusted under 35 U.S.C. 154(b) by 0 days.

(21) Appl. No.: 09/630,125

(22) Filed: Aug. 1, 2000

Related U.S. Application Data

(62) Division of application No. 08/995,789, filed on Dec. 22, 1997, now Pat. No. 6,162,857.
(60) Provisional application No. 60/053,576.

(51) Int. Cl.[7] .............................. C08J 5/10; C08K 3/34; C08L 31/00
(52) U.S. Cl. ...................... 524/445; 524/448; 524/450; 524/451
(58) Field of Search ................................. 523/200, 216; 524/445, 447, 448, 450, 451, 789, 791, 714, 718, 736, 739, 879

(56) References Cited

U.S. PATENT DOCUMENTS

| | | | |
|---|---|---|---|
| 2,531,427 A | 11/1950 | Hauser | |
| 2,737,517 A | 3/1956 | Boyd | |
| 2,924,609 A | 2/1960 | Joyce | |
| 2,938,914 A | 5/1960 | Joyce | |
| 2,957,010 A | 10/1960 | Straley et al. | |
| 2,966,506 A | 12/1960 | Jordan | |

(List continued on next page.)

FOREIGN PATENT DOCUMENTS

| | | |
|---|---|---|
| DE | 3806548 | 9/1988 |
| DE | 3808623 | 10/1988 |
| EP | 0186456 | 7/1986 |
| EP | 0202532 | 11/1986 |
| EP | 0261430 | 3/1988 |
| EP | 0278403 | 8/1988 |

(List continued on next page.)

OTHER PUBLICATIONS

LeBaron et al., "Polymer–layered silicate nanocomposites: an overview," *App. Clay Sci.*, 15, 11–29 (1999).
Ke et al., "Crystallization, Properties, and Crystal and Nanoscale Morphology of PET–Clay Nancomposites," *J. Appl. Polym. Sci.*, 71, 1139–1146 (1999).
Kawasumi et al., "Preparation and Mechanical Properties of Polypropylene–Clay Hybrids," *Macromolecules*, 30, 6333–6338 (1997).
Usuki et al., "Synthesis of Propylene–Clay Hybrid", *J. Appl. Polym. Sci.*, 63, 137–139 (1997).
Giannelis, "Polymer Layered Silicate Nanocomposites," *Advanced Materials*, 8, 29–35 (1996).
Kurowaka et al., "Preparation of a nanocomposite of polypropylene and smectite,"*J. Materials Science Letters*, 15, 1481–1483 (1996).
Oriakhi et al., "Incorporation of poly(acrylic acid), poly(vinylsulfonate) and poly(styrenesulfonate) within layered double hydroxides," *J. Mater. Chem.*, 6, 103–107 (1996).

(List continued on next page.)

*Primary Examiner*—James J. Seidleck
*Assistant Examiner*—U. K. Rajguru
(74) *Attorney, Agent, or Firm*—Karen A. Harding, Esq.; Bernard J. Graves, Jr. Esq.

(57) ABSTRACT

The present invention relates to a polyester-platelet particle composite comprising at least one polyester having dispersed therein a platelet particle dispersion comprising chalcogen or platelet particles and at least one water dissipatible polymer.

20 Claims, 11 Drawing Sheets

U.S. PATENT DOCUMENTS

| | | |
|---|---|---|
| 3,076,821 A | 2/1963 | Hoare |
| 3,125,586 A | 3/1964 | Katz et al. |
| 3,232,934 A | 2/1966 | Hoare |
| 3,281,434 A | 10/1966 | Turetzky et al. |
| 3,391,164 A | 7/1968 | Straley et al. |
| 3,499,916 A | 3/1970 | Berthold |
| 3,514,498 A | 5/1970 | Okazaki et al. |
| 3,544,523 A | 12/1970 | Maxion |
| 3,627,625 A | 12/1971 | Jarrett |
| 3,646,072 A | 2/1972 | Shaw |
| 3,700,398 A | 10/1972 | Cole, Jr. |
| 3,792,969 A | 2/1974 | Gertisser |
| 3,823,169 A | 7/1974 | Staub |
| 3,843,479 A | 10/1974 | Matsunami et al. |
| 3,849,406 A | 11/1974 | Basel, et al. |
| 3,876,552 A | 4/1975 | Moynihan |
| 3,946,089 A | 3/1976 | Furukawa et al. |
| 4,018,746 A | 4/1977 | Brinkmann et al. |
| 4,064,112 A | 12/1977 | Rothe et al. |
| 4,071,503 A | 1/1978 | Thomas et al. |
| 4,081,496 A | 3/1978 | Finlayson |
| 4,105,578 A | 8/1978 | Finlayson et al. |
| 4,116,866 A | 9/1978 | Finlayson |
| 4,133,802 A | 1/1979 | Hachiboshi et al. |
| 4,161,578 A | 7/1979 | Herron |
| 4,163,002 A | 7/1979 | Pohl et al. |
| 4,208,218 A | 6/1980 | Finlayson |
| 4,219,527 A | 8/1980 | Edelman et al. |
| 4,239,826 A | 12/1980 | Knott, II et al. |
| 4,391,637 A | 7/1983 | Mardis et al. |
| 4,393,007 A | 7/1983 | Priester et al. |
| 4,398,642 A | 8/1983 | Okudaria et al. |
| 4,410,364 A | 10/1983 | Finlayson et al. |
| 4,412,018 A | 10/1983 | Finlayson et al. |
| 4,429,079 A | 1/1984 | Shibata et al. |
| 4,434,075 A | 2/1984 | Mardis et al. |
| 4,434,076 A | 2/1984 | Mardis et al. |
| 4,442,163 A | 4/1984 | Kühner et al. |
| 4,450,095 A | 5/1984 | Finlayson |
| 4,472,538 A | 9/1984 | Kamigaito et al. |
| 4,482,695 A | 11/1984 | Barbee et al. |
| 4,517,112 A | 5/1985 | Mardis et al. |
| 4,536,425 A | 8/1985 | Hekal |
| 4,546,126 A | 10/1985 | Breitenfellner et al. |
| 4,595,715 A | 6/1986 | Kuze et al. |
| 4,600,409 A | 7/1986 | Campbell |
| 4,646,925 A | 3/1987 | Nohara |
| 4,676,929 A | 6/1987 | Rittler |
| 4,677,158 A | 6/1987 | Tso et al. |
| 4,680,208 A | 7/1987 | Aoki et al. |
| 4,720,420 A | 1/1988 | Crass et al. |
| 4,725,466 A | 2/1988 | Crass et al. |
| 4,739,007 A | 4/1988 | Okada et al. |
| 4,742,098 A | 5/1988 | Finlayson et al. |
| 4,769,078 A | 9/1988 | Tso |
| 4,777,206 A | 10/1988 | Rittler |
| 4,810,734 A | 3/1989 | Kawasumi et al. |
| 4,886,885 A | 12/1989 | Usaki et al. ................. 524/445 |
| 4,894,411 A | 1/1990 | Okada et al. |
| 4,946,365 A | 8/1990 | Kudert et al. |
| 4,957,980 A | 9/1990 | Kobayashi et al. |
| 4,983,432 A | 1/1991 | Bissot |
| 4,983,719 A | 1/1991 | Fox et al. |
| 4,994,313 A | 2/1991 | Shimizu et al. |
| 5,028,462 A | 7/1991 | Matlack et al. |
| 5,034,252 A | 7/1991 | Nilsson et al. |
| 5,037,285 A | 8/1991 | Kudert et al. |
| 5,091,462 A | 2/1992 | Fukui et al. |
| 5,102,948 A | 4/1992 | Deguchi et al. |
| 5,110,501 A | 5/1992 | Knudson Jr. et al. |
| 5,149,485 A | 9/1992 | Belcher |
| 5,153,061 A | 10/1992 | Cavagna et al. |
| 5,153,062 A | 10/1992 | Grolig et al. |
| 5,164,440 A | 11/1992 | Deguchi et al. |
| 5,164,460 A | 11/1992 | Yano et al. |
| 5,206,284 A | 4/1993 | Fukui et al. |
| 5,221,507 A | 6/1993 | Beck et al. |
| 5,248,720 A | 9/1993 | Deguchi et al. |
| 5,273,706 A | 12/1993 | Laughner |
| 5,314,987 A | 5/1994 | Kim et al. |
| 5,334,241 A | 8/1994 | Jordan |
| 5,336,647 A | 8/1994 | Naé et al. |
| 5,340,884 A | 8/1994 | Mills et al. |
| 5,374,306 A | 12/1994 | Schlegel et al. |
| 5,382,650 A | 1/1995 | Kasowski et al. |
| 5,385,776 A | 1/1995 | Maxfield et al. |
| 5,414,042 A | 5/1995 | Yasue et al. |
| 5,429,999 A | 7/1995 | Naé et al. |
| 5,434,000 A | 7/1995 | Konagaya et al. |
| 5,514,734 A | 5/1996 | Maxfield et al. |
| 5,523,045 A | 6/1996 | Kudert et al. |
| 5,530,052 A | 6/1996 | Takekoshi et al. |
| 5,552,469 A | 9/1996 | Beall et al. ................. 524/445 |
| 5,578,672 A | 11/1996 | Beall et al. ................. 524/446 |
| 5,612,138 A | 3/1997 | Kurz et al. |
| 5,620,774 A | 4/1997 | Etchu et al. |
| 5,648,159 A | 7/1997 | Sato |
| 5,660,761 A | 8/1997 | Katsumoto et al. |
| 5,665,454 A | 9/1997 | Hosoi et al. |
| 5,728,764 A | 3/1998 | Bauer et al. |
| 5,747,560 A | 5/1998 | Christiani et al. |
| 5,780,376 A | 7/1998 | Gonzales et al. |
| 5,807,630 A | 9/1998 | Christie et al. |
| 5,830,544 A | 11/1998 | Kerscher et al. |
| 5,882,751 A | 3/1999 | Occhiello et al. |
| 5,942,320 A | 8/1999 | Miyake et al. |
| 5,952,093 A | 9/1999 | Nichols et al. |
| 5,993,769 A | 11/1999 | Pinnavaia et al. |
| 6,017,632 A | 1/2000 | Pinnavaia et al. |
| 6,034,163 A | 3/2000 | Barbee et al. |
| 6,036,765 A | 3/2000 | Farrow et al. |
| 6,050,509 A | 4/2000 | Clarey et al. |
| 6,057,396 A | 5/2000 | Lan et al. |
| 6,060,549 A | 5/2000 | Li et al. |
| 6,071,988 A | 6/2000 | Barbee et al. |
| 6,084,019 A | 7/2000 | Matayabas, Jr. et al. |
| 6,117,541 A | 9/2000 | Frisk |
| 6,120,860 A | 9/2000 | Bowen et al. |
| 6,162,857 A | 12/2000 | Trexler et al. |
| 6,232,388 B1 | 5/2001 | Lan et al. |

FOREIGN PATENT DOCUMENTS

| | | |
|---|---|---|
| EP | 0295336 | 12/1988 |
| EP | 0398551 | 11/1990 |
| EP | 0459472 | 12/1991 |
| EP | 0542266 | 5/1993 |
| EP | 0590263 | 4/1994 |
| EP | 0650994 | 5/1995 |
| EP | 0691212 | 1/1996 |
| EP | 0691376 | 1/1996 |
| EP | 0681990 | 11/1996 |
| EP | 0747451 | 12/1996 |
| EP | 0761739 | 3/1997 |
| EP | 0 780 340 A1 | 6/1997 |
| EP | 0822163 | 2/1998 |
| EP | 0846723 | 6/1998 |
| EP | 0909787 | 4/1999 |
| EP | 0940430 | 9/1999 |
| GB | 1090036 | 11/1967 |
| GB | 2123014 | 1/1984 |
| JP | 75-001156 | 1/1975 |

| | | |
|---|---|---|
| JP | 75-005735 | 3/1975 |
| JP | 75-005751 | 3/1975 |
| JP | 75-010196 | 4/1975 |
| JP | 76-029697 | 3/1976 |
| JP | 62-073943 | 4/1987 |
| JP | 7-026123 | 1/1995 |
| JP | 9-048908 | 2/1997 |
| JP | 9-176461 | 7/1997 |
| JP | 92-17012 | 8/1997 |
| JP | 10-001608 | 1/1998 |
| JP | 10-077427 | 3/1998 |
| JP | 10-133013 | 5/1998 |
| JP | 10-168305 | 6/1998 |
| WO | WO 84/03096 | 8/1984 |
| WO | WO 93/04125 | 12/1991 |
| WO | WO 93/04117 | 3/1993 |
| WO | WO 93/04118 | 3/1993 |
| WO | WO 93/11190 | 6/1993 |
| WO | WO 93/14922 | 8/1993 |
| WO | WO 94/11430 | 5/1994 |
| WO | WO 94/29378 | 12/1994 |
| WO | WO 95/06090 | 3/1995 |
| WO | WO 95/14733 | 6/1995 |
| WO | WO 96/08526 | 3/1996 |
| WO | WO 96/25458 | 8/1996 |
| WO | WO 97/17398 | 5/1997 |
| WO | WO 97/30950 | 8/1997 |
| WO | WO 97/31057 | 8/1997 |
| WO | WO 97/31973 | * 9/1997 |
| WO | WO 97/44384 | 11/1997 |
| WO | WO 98/01346 | 1/1998 |
| WO | WO 98/29499 | 7/1998 |
| WO | WO 98/53000 | 11/1998 |
| WO | WO 99/02593 | 1/1999 |
| WO | WO 99/15432 | 4/1999 |
| WO | WO 99/41299 | 8/1999 |
| WO | WO 0034378 | 6/2000 |
| WO | WO 0034393 | 6/2000 |

OTHER PUBLICATIONS

Messersmith et al., "Syntheses and Barrier Properties of Poly(ε–Caprolactone)–Layered Silicate Nanocomposites," *J. of Polym. Sci.*, 33, 1047–1057 (1995).

Pinnavaia et al., "Clay–Reinforced Epoxy Nanocomposites, "*Chem. Mater.*, 6, 2216–2219 (1994).

Sugahara et al., "Clay–Organic Nano–Compositie; Preparation of a Kaolinite –Poly(vinylpyrrolidone) intercalation Compound," *Ceramic Society of Japan*, 100, 413–416 (1992).

Yano et al., "Synthesis and properties of polymide–clay hybrid," *ACS, Polymer Preprints*, 32, 65–66, (1991).

Fukushima et al., "Swelling Behavior of Montmorillonite by Poly–6–Amide," *Clay Minerals, 23*, 27–34 (1988).

Verbicky, *Encyclopedia of Polymer Science and Engineering*, 2nd Edition, 12, 364–383 (1988).

Fukushima et al., "Synthesis of an Intercalated Compound of Montmorillonite and 6–Polyamide," *J. Inclusion Phenomena*, 5, 473–482, (1987).

Okada et al., "Synthesis and Characterization of a Nylon 6–Clay Hybrid, " *ACS, Polymer Preprints*, 28, 447–448, (1987).

Fahn et al., "Reaction Products of Organic Dye Molecules with Acid–Treated Montmorillonite," *Clay Minerals*, 18, 447–458 (1983).

Greenland, "Adsorption of Polyvinyl Alcohols by Montmorillonite,"*J. Colloid Sci.,* 18, 647–664 (1963).

* cited by examiner

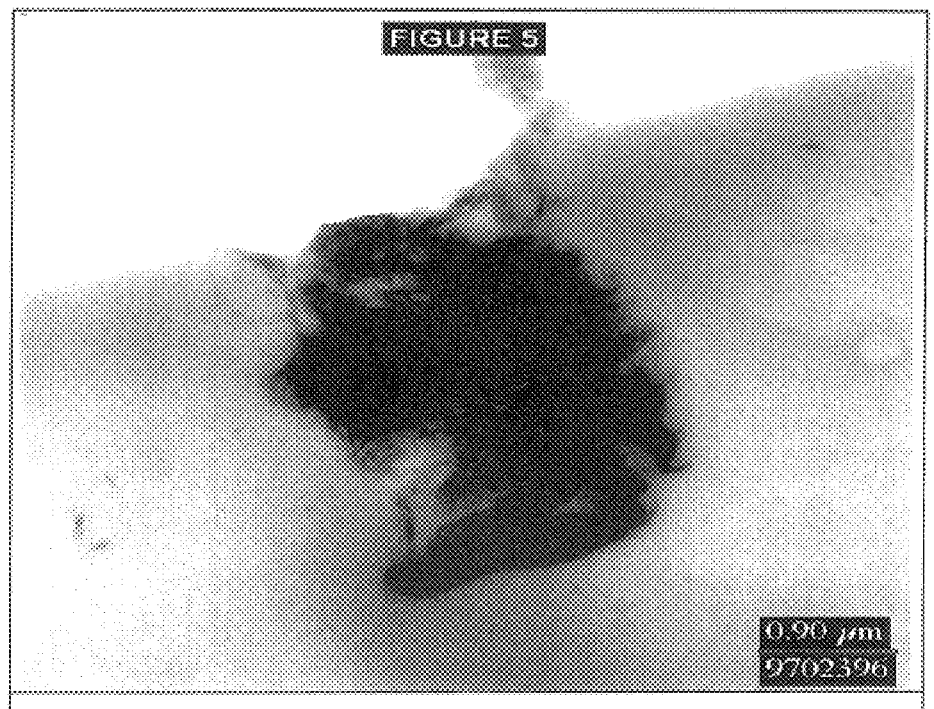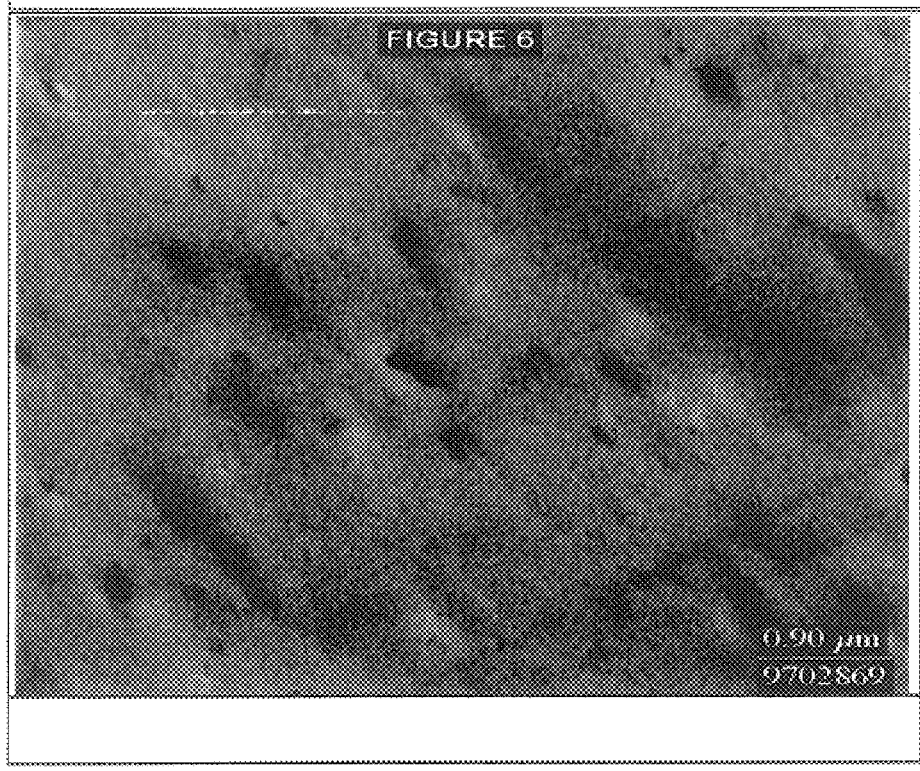

POLYESTER/PLATELET PARTICLE COMPOSITIONS DISPLAYING IMPROVED DISPERSION

RELATED APPLICATIONS

This application is a divisional of, and claims the benefit of, application Ser. No. 08/995,789, filed Dec. 22, 1997, now U.S. Pat. No. 6,162,857 which status is allowed and which is incorporated by reference in its entirety herein.

This application claims the benefit of provisional application U.S. Ser. No. 60/053,573 filed on Jul. 21, 1997.

BACKGROUND OF INVENTION

Polyesters such as poly(ethylene terephthalate) (PET) are widely used in bottles and containers which are used for carbonated beverages, fruit juices, and certain foods. Useful polyesters have high inherent viscosities (I.V.) which allow the polyester to be formed into a parison and subsequently molded into a container. Because of the limited barrier properties with regard to oxygen, carbon dioxide and the like, PET containers are not generally used for products requiring long shelf life. For example, oxygen transmission into PET bottles that contain beer, wine and certain food products cause these products to spoil.

The preparation of polymer/clay nanocomposites containing for example, nylon-6 and alkyl ammonium treated montmorillonite have been disclosed. However, most prior attempts used polyamides due to their hydrogen bonding character and corresponding synergistic interaction with the negatively charged clay. The application of this technology to polyesters, particularly to improve barrier, has been limited due to the inability to achieve the required level of dispersion of the clay particles.

U.S. Pat. No. 4,889,885 discloses the polymerization of various vinyl monomers such as methyl methacrylate and isoprene in the presence of sodium montmorillonite. Example 11 describes the polycondensation of dimethyl terephthalate and ethylene glycol in the presence of 33 weight percent of a montmorillonite clay in water (for 6.2 final weight percent of clay in the polyester resin). However, the nanocomposite displayed only marginal improvement in barrier due to insufficient separation. Moreover, to achieve desirable molecular weights, the method used unacceptably long synthesis times to compensate for reduced condensation rates resulting from the high composite viscosity at low shear that occurs upon addition of the clay. In addition, the long exposure times to high-temperature during the polyester synthesis resulted in poor nanocomposite color.

WO 93/04117 and WO 93/04118 disclose the blending of up to 60 weight percent of intercalated clay materials with a wide range of polymers including polyamides, polyesters, polurethanes, polycarbonates, polyolefins, vinyl polymers, thermosetting resins and the like. Although the use of polyesters are disclosed as useful polymers and an example of a PET/Quat-Clay nanocomposite is providing in WO 93/04118, compositions prepared as described exhibit insufficient clay dispersion resulting in aesthetically poor composites. In addition, this method of preparation does not lead to improved barrier due to lack of separation.

U.S. Pat. Nos. 5,552,469 and 5,578,672 describes the preparation of intercalates derived from certain clays and water-soluble polymers such as polylvinyl pyrrolidone, polyvinyl alcohol, and polyacrylic acid. The specification describes a wide range of thermoplastic resins including polyesters and rubbers that can be used in blends with these intercalates. The disadvantages of this method are (1) poor thermal stability of the intercalant resin at PET processing temperatures causing extensive color and reactivity with the polyester resin, (2) poor compatibility with the polyester resin, (3) and insufficient contribution to barrier due to incomplete separation. The inability to contribute to barrier would not be predicted based on the disappearance of the d(001) montmorillonte X-ray defraction pattern as observed in FIG. 5 of U.S. Pat. No. 5,578,672.

JP Kokai patent no. 9-176461 discloses polyester bottles wherein the polyester contains swellable laminar silicate. WO 97/31057 discloses polymer composite having dispersed therein inorganic material such as clay which is separated with an inorganic intercalant WO 97/31973 discloses a producing a composite material by mixing a potassium ionomer in which ethylene methacrylate copolymer is either partially or completely neutralized with an organic polymer. However, the foregoing references produce materials comprising very large tactoids and little if any dispersion of individual platelet particles. Nor do any of the references disclose nanocomposite compositions having other specific properties such as melt strength and viscoity and high I.V.

Thus there remains a need in the art for a process capable of introducing substantially separated platelet particles to polyesters to produce nanocomposites having improved barrier and good thermal stability.

DESCRIPTION OF THE FIGURES

FIG. 5 is a transmission electron micrograph at 30,000× of PET polyester-platelet particle composite containing 2 weight % untreated sodium montmorillonite.

FIG. 6 is a transmission electron micrograph at 30,000× of PET polyester-platelet particle composite containing 2 weight % sodium montmorillonite treated with 4 weight % AQ-55.

FIG. 7 is a transmission electron micrograph at 1,000,000× of PET polyester-platelet particle composite containing 2 weight % untreated sodium montmorillonite.

FIG. 8 is a transmission electron micrograph at 1,000,000× of PET polyester-platelet particle composite containing 2 weight % sodium montnorillonite treated with 4 weight % AQ-55.

FIG. 14 is a transmission electron micrograph at 100,000× of PET polyester-platelet particle composite containing 2 weight % Claytone treated with 2 weight % AQ-55.

FIG. 15 is a transmission electron micrograph at 100,000× of PET polyester-platelet particle composite containing 2 weight % Claytone treated with 4 weight % AQ-55.

FIG. 16 is a transmission electron micrograph at 100,000× of PET polyester-platelet particle composite containing 2 weight % Claytone treated with 8 weight % AQ-55.

FIG. 17 is a transmission electron micrograph at 100,000× of PET polyester-platelet particle composite containing 2 weight % Claytone treated with 14 weight % AQ-55.

DESCRIPTION OF THE INVENTION

Figure 1:
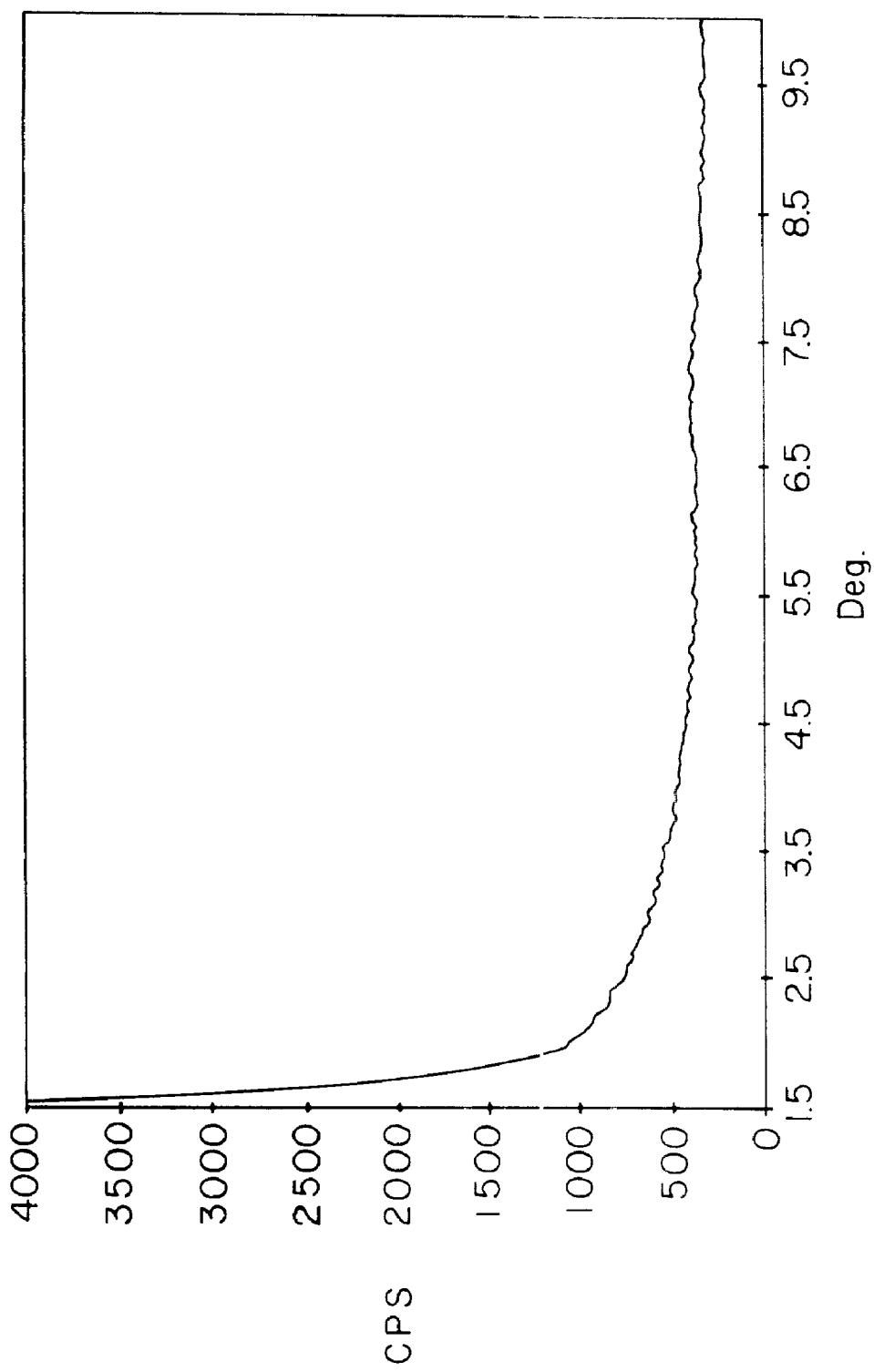
FIG. 1 is an X-ray plot for a polyester-platelet particle composite containing 2 weight % untreated sodium montmorillonite.

This invention relates to a process for preparing polyester composite materials composed of polyester resin and platelet particles uniformly dispersed therein that exhibit improved gas banier properties; the composite materials so produced, and products produced from said composite.

More particularly, the present invention relates to dispersions comprising water-dispersable polymers and dispersed therein platelet particles derived from various clay materials which may be untreated or metal intercalated, organically modified through cation ion exchange; intercalated with other high molecular weight pretreatment compounds. The dispersion effectiveness of the water-dispersible polymers are strongly influenced by the presence of anionic sulfo-salt modification; a feature that would not be expected to be beneficial, based on the negative charged characteristic of the clay surface.

More specifically, this invention relates to a process comprising the steps of dispersing at least one clay material in a water dispersible polymer to form a clay dispersion; introducing said dispersion to a polyester and extrusion mixing said dispersion and polyester to form a platelet particle-polyester composite composition which is primarily comprised of platelet particles and tactoids. Composite compositions produced according to the present invention display a gas permeability which is at least 5% lower than that of unmodified polyester.

In a typical procedure, the desired clay is added to water to form a suspension. Enough water is added to make a stirrable solution, preferably greater than about 20:1, and more preferably from about 25:1 to about 35:1 parts water to parts clay by weight. Larger amounts of water may be used, but generally are not preferred because most of the water should generally be driven off prior to compounding. If modification of the clay surface (e.g., use of a quaternary ammonium salt) is desired, this can be done either prior to or subsequent to the addition of the water. The water dispersible, polymer is added to the clay/water suspension. Generally, the water dispersible polymer is added in solution form. The amount of water dispersible polymer necessary to achieve optimum platelet particle separation can be confirmed X-ray defraction and confirmed by Transmission Electron Microscopy. The reduction in oxygen permeability achieved will depend on the clay and in particular, the clay surface modification. Improvements in platelet particle separation in the polyester are seen at concentrations of water dissipatible polymer as low as about 1:1 water dissipatible polymer:platelet particle. Amounts of water dissipatible polymer which are greater than about 20:1 may not be preferred in some applications due to the large amount of water dissipatible polymer which results in the base polyester. Preferably, desirable ranges include those from about 1:1 to about 15:1 and more preferably from about 1:1 to about 10:1 parts water dissipatible polymer to platelet particle as determined by ASTM D5630-94. Typically the solution is thoroughly mixed using device such as a low-shear Waring blender or a high-shear Turrax mixer. Typically, the solution is stirred to form a slurry, which can be accomplished in times of about 5 minutes.

The platelet particle slurry can be coated onto polyester pellets or dried and then introduced onto the pellets or into the polyester in the desired amount via a variety of methods. For example, the aqueous slurry can be added directly to polyester pellets and heat applied to remove the water leaving the platelet particle/water soluble polymer coated on the external surface of the polyester pellets. In practice, the removal of water could be accomplished using a batch device such as a heated Sigma blade mixer or a continuous process such as an extruder to drive off the water leaving the platelet particle coated pellet. Similarly a continuous process can be employed whereby the platelet particle slurry is sprayed on heated pellets as the pellets are passed over a vibrating shaker deck. Using either the batch or continuous processes previously cited, platelet particles can be introduced in the polyester resin to achieve the desired property enhancement or can be incorporated at a concentration the can be diluted in a subsequent operation to the desired target concentration. An alternative method to remove water from the aqueous clay/water-dispersable polymer slurry would be to employ spray drying; the spray-dried, polymer-expanded clay can be added directly to polyester using a conventional melt blending process or added directly to a melt fabrication device such as an injection molding machine or extrusion line.

Figure 18:
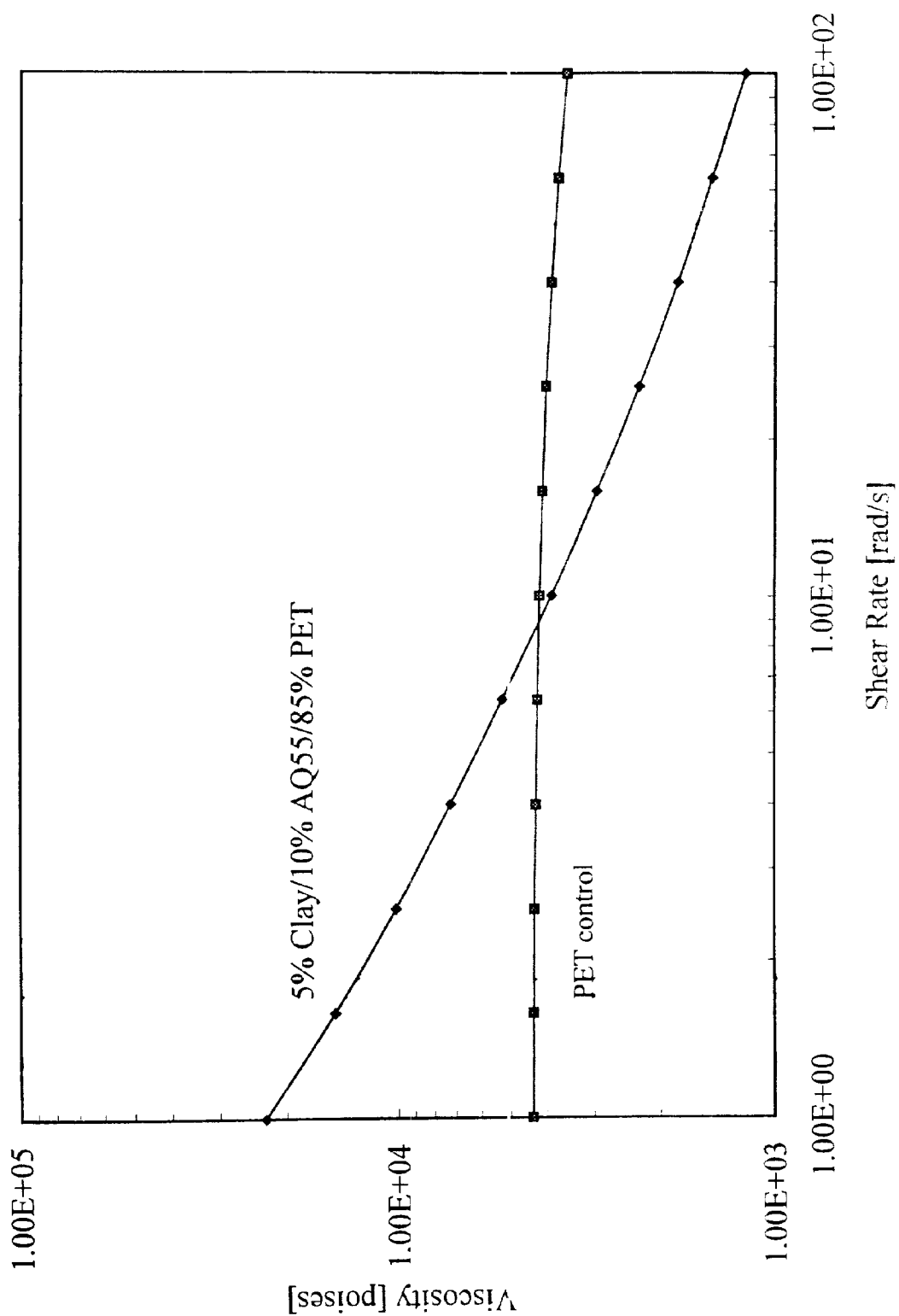
FIG. 18 is a viscosity versus shear rate plot comparing a platelet particle-polyester composite of the present invention and unmodified PET.

The process of the present invention is highly beneficial in that high molecular weight polyesters may be prepared in a conventional manner and then be extrusion blended with expanded platelet particles. FIG. 18 is a plot comparing viscosity versus shear rate for a platelet particle-polyester composite of the present invention and unmodified PET.

For example, in a specific embodiment of the process, a smectite-type clay is added to water in an amount of approximately 20 grams water per gram silicate. About 30 g of the water dispersible polymer, AQ55 is added to about 70 g water. The solution is then mixed for 5 minutes using a Turrax high-speed mixer. The slurry is then charged to a Sigma blade mixer or vented extruder with polyester pellets (1680g) at 100° C. and the water is driven off to provide polyester pellets coated with AQ/clay. The coated pellets are then either premixed by melt-blending (e.g., twin-screw extruder) or can be directly added to a subsequent fabrication machine (e.g., film extruder or bottle pre-form molding machine).

Other methods common to polyester synthesis (e.g., use of solid-stating to increase molecular weight) can be utilized. In addition, additives known to those skilled in polyester formulation, especially to affect resin/filler interfaces (e.g., pH adjustment and use of surfactants), can also be added during the preparation of the slurry.

Alternatively, the AQ/clay/water slurry could be spray-dried and added to the polyester during a subsequent melt-blending operation.

Dispersion Aid

Suitable dispersion aids include water dissipatable polymers. The water dissipatable polymers of the present invention are, for the most part, water-dissipatable (or water dispersible) because they form electrostatically-stabilized colloids when mixed with water. The colloid particle size varies with the polymer composition but has been shown by light diffraction studies and transmission electron microscopy (on fresh films) to be mostly 200–800 Å in diameter. The aqueous colloid dispersions exhibit a minimum precipitation of solid material with time, in the temperature range of 0.1–99.9° C. because the relationship between the particle densities and viscosities (very similar to those of water when concentrations are less than 30 weight percent) are such that thermal energy expressed as Brownian motion is sufficient to keep the particles suspended in water.

The waterdispersible polymers have an inherent viscosity of at least about 0.1 dL/g, preferably about 0.28-about 0.38 dL/g, when determined at 25° C. using 0.25 g polymer per 100 ml of a solvent consisting of 60 parts by weight phenol and 40 parts by weight tetrachloro-ethane.

Preferably the water dissipatable polymers include sulfonate-containing, water-dispersible, linear polymers comprising polyesters, including polyester-amides, consisting of repeating, alternating residues of (1) one or more dicarboxylic acids and (2) one or more diols or a combination of one or more diols and one or more diamines where, in the preceding definition, the mole percentages are based on 100 mole percent dicarboxylic acid residues and 100 mole percent diol or diol and diamine residues. Alternatively, the polymers may include residues of monomers having mixed functionality such as hydroxycarboxylic acids, aminocarboxylic acids and/or aminoalkanols.

Generally the water-dissipatable polyesters and polyesteramides derived from monomer components which include dicarboxylic acid, hydroxycarboxylic acid, aminocarboxylic acid, aminoalcohol, glycol, diamine or combinations of such monomer components wherein at least a part of the total of all such monomer components is poly(ethylene glycol), and at least a part of said total is one or more of said monomer components substituted with one or more sulfonate metal salt groups.

The residues of dicarboxylic aicd component (1) may be derived from one or more dicarboxylic acids or their ester-forming derivatives such as dialkyl esters, bis(hydroxyalkyl) esters, acid chlorides or, in some cases, anhydrides. The sulfonate group may be an alkali metal sulfonic salt such as lithium, potassium or, preferably, sodium sulfonate groups, or an ammonium or substituted ammonium sulfonate.

The preferred water-dispersible polymers have an inherent viscosity of about 0.28 to 0.38 dL/g and are comprised of:

(i) diacid monomer residues comprising about 75 to 84 mole percent isophthalic acid monomer residues and about 16 to 25 mole percent 5-sodiosulfoisophthalic acid monomer residues; and (ii) diol monomer residues comprising about 45 to 60 mole percent diethylene glycol monomer residues and about 40 to 55 mole percent ethylene glycol, 1,4-cyclohexanedimethanol monomer residues or mixtures thereof.

Specific embodiments of these water-dispersible polymers are available from Eastman Chemical Company, (EASTMAN AQ 29S Polymer, EASTMAN 38S Polymer and EASTMAN 55S Polymer) and in the form of aqueous dispersions (EASTMAN AQ 29D Polymer, EASTMAN 38D Polymer and EASTMAN 55D Polymer). These polyesters have been shown to disperse in water due to the presence of 5-sodiosulfoisophthalic acid residues.

Preferably, the water dispersible polyester above contains some poly(ethylene glycol) to aid in its water dispersibility. When some poly(ethylene glycol) is used, the content of the sulfomonomer can be lower, which aids in flexibility of formulating the polyester.

The water dispersibility of the polyester is related to the weight percent of poly(ethylene glycol) and mole percent of sulfomonomer. Therefore, if the content of either is relatively low, the other should be relatively high to maintain adequate dispersibility.

The poly(ethylene glycol) need not be present in the initial reaction charge, because poly(ethylene glycol) may form in situ from decomposition products and be incorporated into the polyester chain. It is well known, for example, that diethylene glycol is formed in situ in such reactions.

In the preferred form of the present invention, the polyester contains repeating units of a poly(ethylene glycol) of the formula $H—(OCH_2—CH_2)n—OH$ wherein n is an integer of 2 to 500. The value of n is preferably from between about 2 to about 20. The values of n and the mole percent of poly(ethylene glycol) in the polyester, if used, are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol) is an important consideration because the water dissipatability of the copolyester decreases as the weight percent poly(ethylene glycol) in the copolyester decreases. For example, if the weight of poly(ethylene glycol) is too low, the water dissipatability of the copolyester may be inadequate. Furthermore, the weight percent of poly(ethylene glycol) is preferably adjusted such that it is inversely proportional to the mole percent of the difunctional sulfomonomer because the water dissipatability of the copolyester is a function of both the mole percent sulfomonomer and the weight percent polyethylene glycol.

Examples of suitable poly(ethylene glycols) include relatively high molecular weight polyethylene glycols, some of which are available cornmercially under the designation CARBOWAX, a product of Union Carbide. Diethylene glycol is also especially suitable.

Other useful glycols for preparing copolyesters include aliphatic, alicyclic and aralkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol, 1,5-pentanediol, 1,6-hexanediol, 2,2,4-trimethyl-1,6-hexanediol; thiodiethanol. 1,2-cyclohexanedimethanol, 1,3-cyclohexandimethanol; 1,4-cyclohexanedimethanol; 2,2,4,4-tetramethyl-1,3-cyclobutanediol; and p-xylylenediol.

The dicarboxylic acid component of the polyesters are preferably selected from aliphatic dicarboxylic acids, alicyclic dicarboxylic acids, aromatic dicarboxylic acids, or mixtures of two or more of these acids. Examples of such dicarboxylic acids, include succinic; glutaric; adipic; azelaic; sebacic; 1,4-cyclohexanedicarboxylic; phthalic; terephthalic and isophthalic acid. Terephthalic acid and isophthalic acid are preferred as the carboxylic acid component of the polyester.

It should be understood that use of the corresponding acid anhydrides, esters, and acid chlorides of these acids is included in the term "dicarboxylic acid."

The difunctional sulfomonomer component of the polyester may advantageously be a dicarboxylic acid or an ester thereof containing a metal sulfonate group, a glycol containing a metal sulfonate group or a hydroxy acid containing a metal sulfonate group. The metal ion of the sulfonate salt may be Na+, Li+, K+ and the like. When a monovalent alkali metal ion is used, the resulting polyesters are less readily dissipated by cold water and more readily dissipated by hot water. When a divalent or a trivalent metal ion is used the resulting polyesters are not ordinarily easily dissipated by cold water but are more readily dissipated in hot water. It is possible to prepare the polyester using, for example, a sodium sulfonate salt and latex and by ion-exchange replace this ion with a different ion, and thus alter the characteristics of the polymer. The difinctional monomer component may also be referred to the difunctional sulfomonomer and is further described herein below.

Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters.

Particularly superior results are achieved when the difunctional sulfomonomer component is 5-sodiosulfoisophthalic acid or its esters, and the glycol is a mixture of ethylene glycol or 1,4-cyclohexanedimethanol with diethylene glycol.

A particularly preferred water dissipatable polymer is composed of 80 mole parts of isophthalic acid, 10 mole parts of adipic acid, 10 mole parts of 5-sodiosulfoisophthalate, 20 mole parts of ethylene glycol and 80 mole parts diethylene glycol.

Platelet Particles

The compositions of the present invention comprise between about 0.01 and about 25 wt %, preferably between 0.5 and 25 wt %, more preferably between 0.5 and 15 wt % and most preferably between 0.5 and 10 wt % of certain platelet particles derived from organic and inorganic clay materials. The amount of platelet particles is determined by measuring the amount of ash of the polyester-platelet compositions when treated in accordance with ASTM D5630-94, which is incorporated herein by reference.

The platelet particles of the present invention have a thickness of less than about 2 nm and a diameter in the range of about 10 to about 1000 nm. For the purposes of this invention measurements refer only to the platelet particle and not any dispersing aids or pretreatment compounds which might be used. Suitable platelet particles are derived from clay materials which are free flowing powders having a cation exchange capacity between about 0.3 and about 3 meq/g and preferably between about 0.8 and about 1.5 meq/g. Examples of suitable clay materials include mica-type layered phyllosilicates, including clays, smectite clays, sodium montmorillonite, sodium hectorite, bentonites, nontronite, beidelite, volonsloite, saponite, sauconite, magadiite, kenyaite, synthetic sodium hecotorites, and the like. Clays of this nature are available from various companies including Southern Clay Products and Nanocor, Inc. Generally the clay materials are a dense agglomeration of platelet particles which are closely stacked together like cards.

Other non-clay materials having the above described ion exchange capacity and size, such as chalcogens may also be used as the source of platelet particles under the present invention. These materials are known in the art and need not be described in detail here.

The prior art has defined the degree of separation of the platelet particles based on peak intensity and basal spacing, or lack thereof, as determined by X-ray analyses of polymer-platelet composites. However, in polyester composites X-ray analysis alone does not accurately predict the dispersion of the platelet particles in the polyester nor the resultant barrier improvement. TEM images of polyester-platelet composites show that platelet particles which are incorporated into at least one polyester exist in a variety of forms, including, but not limited to invdividual platelets (the exfoliated state), disordered agglomerates of platelets, well ordered or stacked aggregates of platelets (tactoids) and aggregates of tactoids. X-ray analysis only provides information related to the well ordered aggregates, which are only a small portion of the platelet particles which are present.

Without being bound by any particular theory, it is believed that the degree of improved barrier depends upon the aspect ratio of the resulting particle platelets and aggregates, the degree to which they are dispersed or uniformly distributed and the degree to which they are ordered perpendicular to the flux of the permeant. To obtain the improvements in gas permeability and the enhanced melt viscosity disclosed in the present invention it is necessary that the platelet particles be dispersed in the polyester such that the majority, preferably at least about 75% and perhaps as much as at least about 90 or more of the platelet particles have a thickness in the shortest dimension of less than about 20 nm and preferably less than about 10 mn as estimated from TEM images representative of the bulk of the composite. Polyester-platelet composites containing more individual platelets and fewer aggregates, ordered or disordered are most preferred. Significant levels of incomplete dispersion (i.e., the presence of large agglomerates and tactoids greater than about 20 nm) not only lead to an exponential reduction in the potential barrier improvements attributable to the platelet particles, but also can lead to deleterious affects to other properties inherent to polyester resins such as strength, toughness, and heat resistance.

Dispersions containing a high level of individual platelet particles have not been previously disclosed. Previous patents and applications have claimed to produce polyesters containing intercalated or exfoliated platelet particles, as indicated by large basal spacings or the lack of a detectable basal spacing by X-ray, however, the results could not be reproduced. With the exception of WO 93/04118 (which does not possess suitable I.V.), the polyester/platelet compositions of the prior art are believed to be dispersions of aggregates with large thickness, typically greater than about 20 nm. While the aggregates were well spaced, very few individual platelets and tactoids or particles with thicknesses less than about 20 nm could be found. Without achieving a good dispersion and small particle size improved barrier and visual properties cannot be achieved.

Improvements in gas barrier also increase as the amount of platelet particles in the polyester increases. While amounts of platelet particles as low as 0.01% provide improved barrier (especially when well dispersed and ordered), compositions having at least about 0.5 wt % of the platelet particles are preferred because they display the desired improvements in gas permeability.

Generally, it is desirable to treat the selected clay material to facilitate separation of the agglomerates of platelet particles to individual platelet particles and small tactoids. Separating the platelet particles prior to incorporation into the polyester also improves the polyester/platelet interface. Any treatment that achieves the above goals may be used. Examples of useful treatments include intercalation with water soluble or water insoluble polymers, organic reagents or monomers, silane compounds, metals or organometallics, organic cations to effect cation exchange, and their combinations.

Treatment of the clay can be accomplished prior to addition of water dispersible polymer to the clay material, during the dispersion of the clay with the ater soluble polymer or during a subsequent melt blending or melt fabrication step.

Examples of useful pretreatment with polymers and oligomers include those disclosed in U.S. Pat. Nos. 5,552,469 and 5,578,672, incorporated herein by reference. Examples of useful polymers for intercalating the platelet particles include polyvinyl pyrrolidone, polyvinyl alcohol, polyethylene glycol, polytetrahydrofuran, polystyrene, polycaprolactone, certain water dispersable polyesters, Nylon-6 and the like.

Examples of useful pretreatment with organic reagents and monomers include those disclosed in EP 780,340 A1, incorporated herein by reference. Examples of useful organic reagents and monomers for intercalating the platelet particles include dodecylpyrrolidone, caprolactone, aprolactam, ethylene carbonate, ethylene glycol, bishydroxyethyl terephthalate, dimethyl terephtlialate, and the like or mixtures thereof.

Examples of useful pretreatment with silane compounds include those treatements disclosed in WO 93/11190, incorporated herein by reference. Examples of useful silane compounds includes (3-glycidoxypropyl)trimethoxysilane, 2-methoxy (polyethyleneoxy)propyl heptamethyl trisiloxane, octadecyl dimethyl (3-trimethoxysilylpropyl) ammonium chloride and the like.

Numerous methods to modify layered particles with organic cations are known, and any of these may be used in the process of this invention. One embodiment of this invention is the modification of a layered particle with an organic cation by the process of dispersing a layered particle material in hot water, most preferably from 50 to 80° C., adding an organic cation salt or combinations of organic cation salts (neat or dissolved in water or alcohol) with agitation, then blending for a period of time sufficient for the organic cations to exchange most of the metal cations present in the galleries between the layers of the clay material. Then, the organically modified layered particle material is isolated by methods known in the art including, but not limited to, filtration, centrifugation, spray drying, and their combinations. It is desirable to use a sufficient amojnt of the organic cation salt to permit exchange of most of the metal cations in the galleries of the layered particle for organic cations; therefore, at least about 1 equivalent of organic cation salt is used and up to about 3 equivalents of organic cation salt can be used. It is preferred that about 1.1 to 2 equivalents of organic cation salt be used, more preferable about 1.1 to 1.5 equivalents. It is desirable, but not required, to remove most of the metal cation salt and most of the excess organic cation salt by washing and other techniques known in the art. The particle size of the organoclay is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than 20 micron in diameter.

Useful organic cation salts for the process of this invention can be represented as follows:

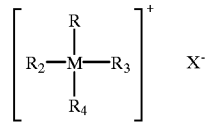

Wherein M represents either nitrogen or phosphourous; $X^-$ represents an anion selected from the group consisting of halogen, hydroxide, or acetate anions, preferably chloride and bromide; $R_1$, $R_2$, $R_3$ and R4 are independently selected from organic and oligomeric ligands or may be hydrogen. Examples of useful organic ligands include, but are not limited to, linear or branched alkyl groups having 1 to 22 carbon atoms, aralkyl groups which are benzyl and substituted benzyl moieties including fused ring moieties having linear chains or branches of 1 to 22 carbon atoms in the alkyl portion of the structure, aryl groups such as phenyl and substituted phenyl including fused ring aromatic substituents, beta, gamma unsaturated groups having six or less carbon atoms, and alkyleneoxide groups having 2 to 6 carbon atoms. Examples of useful oligomeric ligands include, but are not limited to, poly(alkylene oxide), polystyrene, polyacrylate, polycaprolactone, and the like.

Examples of useful organic cations include, but are not limited to, alkyl ammonium ions, such as dodecyl ammonium, octadecyl ammonium, bis(2-hydroxyethyl) octadecyl methyl ammonium, octadecyl benzyl dimethyl ammonium, tetramethyl ammonium, and the like or mixtures thereof, and alkyl phosphonium ions such as tetrabutyl phosphonium, trioctyl octadecyl phosphonium, tetraoctyl phosphonium, octadecyl triphenyl phosphonium, and the like or mixtures thereof. Illustrative examples of suitable organo-clays include those available under the trade name Claytone® and Cloisite® from Southern Clay Products.

It should be appreciated that on a total composition basis dispersing aids and/or pretreatment compounds which are used may account for significant amount of the total composition, in some cases up to about 30 weight %. While it is preferred to use as little dispersing aid/pretreatment compounds as possible, the amounts of dispersing aids and/or pretreatment compounds may be as much as about 8 times the amount of the platelet particles.

Polyesters

The polyester component of the compound of the present invention is present in amounts between about 99.99 wt % to about 75 wt %, preferably between 99.5 and about 75 wt %, more preferably 99.5 to about 85 wt % and most preferably between 99.5 and about 90 wt %. Suitable polyesters include at least one dibasic acid and at least one glycol. The primary dibasic acids are terephthalic, isoplthalic, naphthalenedicarboxylic, 1,4-cyclohexanedicarboxylic acid and the like. The various isomers of naphthalenedicarboxylic acid or mixtures of isomers may be used but the 1,4-, 1,5-, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of suitable dicarboxylic acids include phthalic acid, isophthalic acid, naphthalene-2,6-dicarboxylic acid, cyclohexanedicarboxylic acid, cyclohexanediacetic acid, diphenyl4,4'-dicarboxylic acid, succinic acid, glutaric acid, adipic acid, azelaic acid, sebacic acid, and the like. Polyesters may be prepared from two or more of the above dicarboxylic acids.

Typical glycols used in the polyester include those containing from two to about ten carbon atoms. Preferred glycols include ethylene glycol, propanediol, 1,4-butanediol, 1,6-hexanediol, 1,4-cyclohexanedimethanol, diethylene glycol and the like. The glycol component may optionally be modified with up to about 50 mole percent, preferably up to about 25 mole % and more preferably up to about 15 mole % of one or more different diols. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(i,3), 1,4-di-(2-hydroxyethoxy)-benzene, 2,2b-is-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. Polyesters may be prepared from two or more of the above diols.

Small amounts of multifunctional polyols such as trimethylolpropane, pentaerythritol, glycerol and the like may be used if desired. When using 1,4-cyclohexanedimethanol, it may be the cis, trans or cis/trans mixtures.

The resin may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art.

Although not required, additives normally used in polyesters may be used if desired. Such additives include colorants, pigments, carbon black, glass fibers, impact modifiers, antioxidants, stabilizers, flame retardants, reheat aids, acetaldehyde reducing compounds and the like.

The polyester/disperesed platelet compositions should be crystallizable to an extent that is sufficient to prevent sticking during solid stating.

EXAMPLES

Comparative 1 (Na-Montmorillonite without AQ 55)

Figure 3:
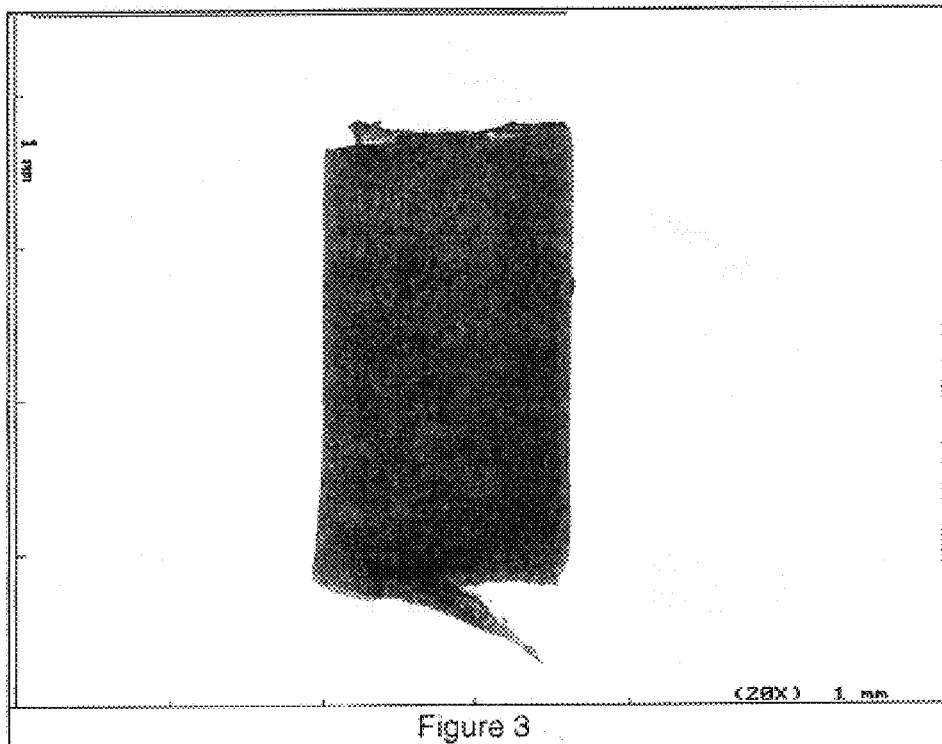
FIG. 3 is an optical micrograph at 20× of PET polyester-platelet particle composite containing 2 weight % untreated sodium montmorillonite.

PET pellets [(9921 Eastman Chemical Company) were placed in a convection oven at 110° C. until processed (minimum of twelve hours, maximum of twenty-four hours) by extrusion compounding. The pellets were tumble-blended with Sodium Montmorillonite from Southern Clay Products (2 w %) then extruded using a Micro-18 twin screw compounding extruder, with a high shear/mixing screw, obtaining pellets as the product. The run conditions were set at 240° C. for the first screw heating zone and 280° C. for heating zones two through eight. The RPM of the extrusion screw was maintained at 200 plus or minus five rpm. The product feed screw was set to maintain 2.5 kg/hr. The molten strand was quenched in chilled water and chopped immediately thereafter. The pellets were dried at 100° C. over night in a force air drier and extruded into film. The compounded pellets were analyzed by X-ray, Optical Miscroscopy at 20x, and Transmission Electron Miscroscopy at 30,000 and 1,000,000×. No significant peak was visible in the X-ray plot (FIG. 1), which, according to prior patents, indicates exfoliation. However, the optical micrograph (FIG. 3) and TEMs (FIG. 5 and 7) clearly show few individual platelet particles and several large agglomerates containing many poorly spaced platelet particles. On both a macroscale and nanoscale untreated sodium montmorillonite displayed poor dispersion in PET. Clearly, X-ray data alone is insufficient to confirm the desired separation of platelet particles. The oxygen permeability of the film showed no substantial improvement, confirming the poor dispersion of platelet particles.

Example 1 (Na-Montmorillonite with AQ 55)

An AQ 55 dispersion was made, such that, every 100 grams of dispersion contained thirty grams AQ 55 total solids by weight and seventy grams Millipore water by weight, giving a total solids in the dispersion equal to 30% by weight. A "slurry" of Millipore water and clay was made by adding forty grams (total silicate by weight) of Sodium Montmorillonite to 600 grams of Millipore water. The clay was dispersed with a three-blade mixer until the clay appeared to be fully wet. At this point an Ultra-Turrax 25 with the S25n-25F dispersing tool was used to input high shear mixing (18,000 rpm) for two minutes. After high shear mixing of the slurry, 266.7 grams of AQ55 (Eastman Chemical Company) 30% dispersion was added to the slurry. Using the Ultra-Turrax 25, the water/AQ 55/clay dispersion was sheared for an additional five minutes. PET pellets (9921, Eastman Chemical Company), 1680 grams, were placed in a Sigma Blade Mixer that had been preheated to a minimum of 85° C. The water/AQ55/clay slurry was poured over the pellets and the new dispersion was mixed in the Sigma Blade mixer until the water from the dispersion had evaporated. A flow of a minimum of twenty cubic feet per hour of heated nitrogen was released over the pellets to help evacuate the water.

Figure 2:
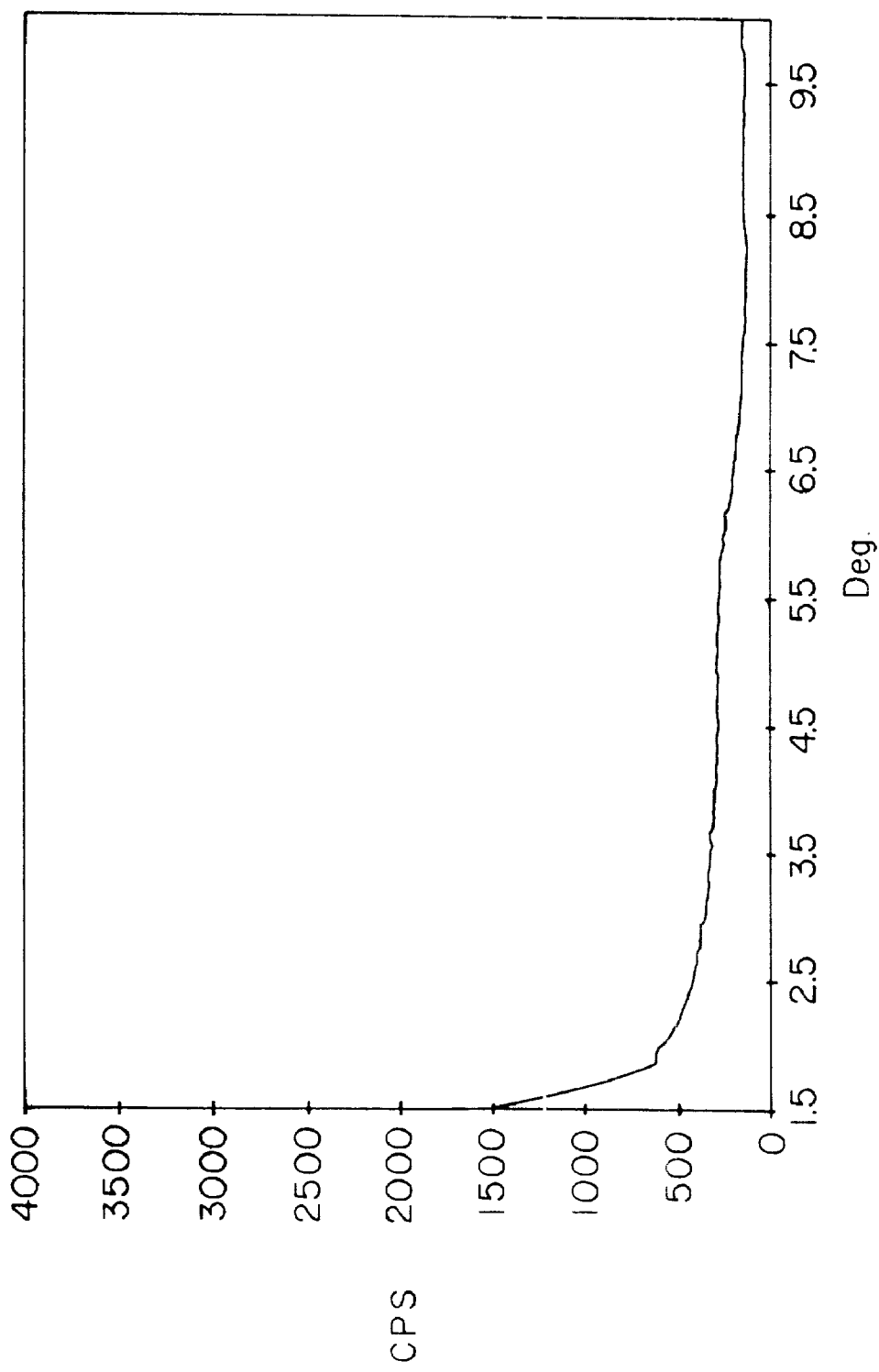
FIG. 2 is an X-ray plot for a polyester-platelet particle composite containing 2 weight % sodium montmorillonite treated with 4 weight % AQ 55.
Figure 4:
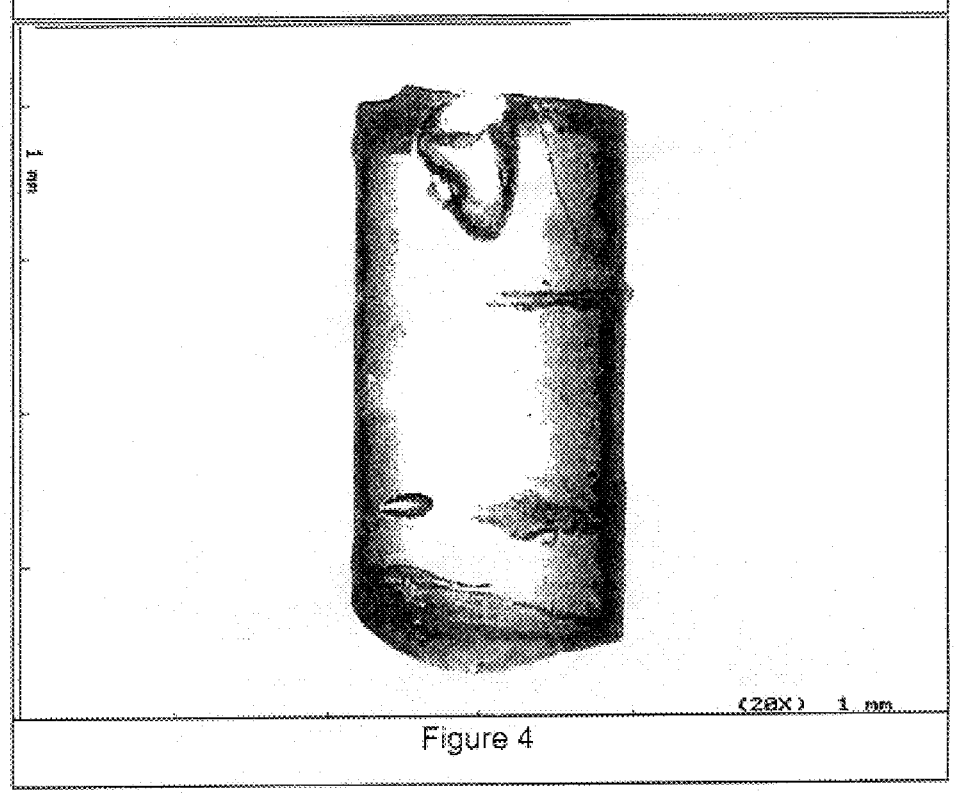
FIG. 4 is an optical micrograph at 20× of PET polyester-platelet particle composite containing 2 weight % sodium montmorillonite treated with 4 weight % AQ55.

Coated pellets were placed in a convection oven at 110° C. until processed (minimum of twelve hours, maximum of twenty-four hours) by extrusion compounding. The coated pellets were extruded using a Leistritz Micro-18 twin screw co-rotating compounding extruder, with a high shear/mixing screw, obtaining pellets as the product. The run conditions were set at 240° C. for the first screw heating zone and 280° C. for heating zones two through eight. The RPM of the extrusion screw was maintained at 200 plus or minus five rpm. The product feed screw was set to maintain 2.5 kg/hr. The molten strand was quenched in chilled water and chopped immediately thereafter. The pellets were dried at 100° C. over night in a force air drier and extruded into film. The compounded pellets were analyzed by X-ray (FIG. 2), Optical Miscroscopy at 20×, (FIG. 4) and Transmission Electron Microscopy at 30,000× and 1,000,000× (FIGS. 6 and 8, respectively). The X-ray plot showed no discemable peak (similar to the results for Comparative Example 1, above). However, the optical micrograph and TEMs show greatly improved platelet particle separation as compared to Example 1. FIGS. 4, 6 and 8 clearly show much better dispersion of the platelet particles and far fewer large agglomerates than the micrographs for the platelet particle-polyester composite which was not treated with an water soluble polymer (Comparative Example 1). Thus, the compositions of the present invention display much better dispersion as compared to those without a water soluble polymer. Moreover, it is clear that X-ray data alone is insufficient to confirm the degree of separation of the platelet particles in the selected polyester. The film made from the Example 1 material was tested for oxygen permeability and, consistent with the improved dispersion, was found to exhibit improved barrier relative to neat PET (Comparative Example 1).

It should be noted that the micrographs included herewith are believed to representative. Because of the small area represented by any micrograph other areas displaying differing levels of dispersion in a given sample are likely to exist. The areas selected are believed to be representative of average morphology of the reported samples.

Comparative Example 2 (Polymer Intercalated Montmorillonite with AQ 55)

PET pellets (9921, Eastman Chemical Company) were placed in a convection oven at 110° C. until processed (minimum of twelve hours, maximum of twenty-four hours) by extrusion compounding. The pellets were tumbled-mixed with PVP-intercalated Montmorillonite clay (30 parts PVP to 70 parts clay; twenty grams total silicate by weight, Nanomer PVP-BPW, from Nanocor, Inc.) that had been spray dried to a fine powder and melted-blended using a Micro-18 compounding twin screw compounding extruder, with a high shear/mixing screw, obtaining pellets as the product. The run conditions were set at 240° C. for the first screw heating zone and 280° C. for heating zones two through eight. The RPM of the extrusion screw was maintained at 200 plus or minus five rpm. The product feed screw was set to maintain 2.5 kg/hr. The molten strand was quenched in chilled water and chopped immediately thereafter. The pellets were dried at 100° C. over night in a force air drier and extruded into film. The compounded pellets were analyzed by Optical Miscroscopy (FIG. 9) which showed large agglomerates of poorly spaced platelet particles indicating poor dispersion. The oxygen permeability of the film showed no substantial improvement, confirming the poor dispersion of platelet particles.

Example 2 (Polymer Intercalated Montmorillonite with AQ 55)

An AQ 55 dispersion was made, such that, every 100 grams of dispersion contained thirty grams AQ 55 total solids by weight and seventy grams Millipore water by weight, giving a total solids in the dispersion equal to 30% by weight. A "slurry" of Millipore water and clay that had been intercalated with Polyvinylpyrollidone (PVP) (30wt % intercalant polymer to clay, Nanomer PVP-BPW, from Nanocor, Inc) and spray dried to a fine powder, was made by adding twenty grams (total silicate by weight) of intercalated Montmorillonite to 600 grams of Milliporc water. The clay was dispersed with a three-blade mixer until the clay appeared to be fully wet. At this point an Ultra-Turrax 25 with the S25n-25F dispersing tool was used to input high shear mixing (18,000 rpm) for two minutes. After high shear mixing of the slurry, 266.7 grams of Eastman Chemical Company AQ55 30% dispersion was added to the slurry. Using the Ultra-Turrax the water/AQ 55/clay/PVP dispersion was sheared for an additional five minutes. PET pellets (9921W, Eastman Chemical Company), 1680 grams, were placed in a Sigma Mixer that had been preheated to a minimum of 85° C. The water/AQ55/clay slurry was poured over the pellets and mixed in the Sigma Blade mixer until the water from the dispersion had evaporated. A flow of a minimum of twenty cubic feet per hour of heated nitrogen was released over the pellets to help evacuate the water.

Figure 9:
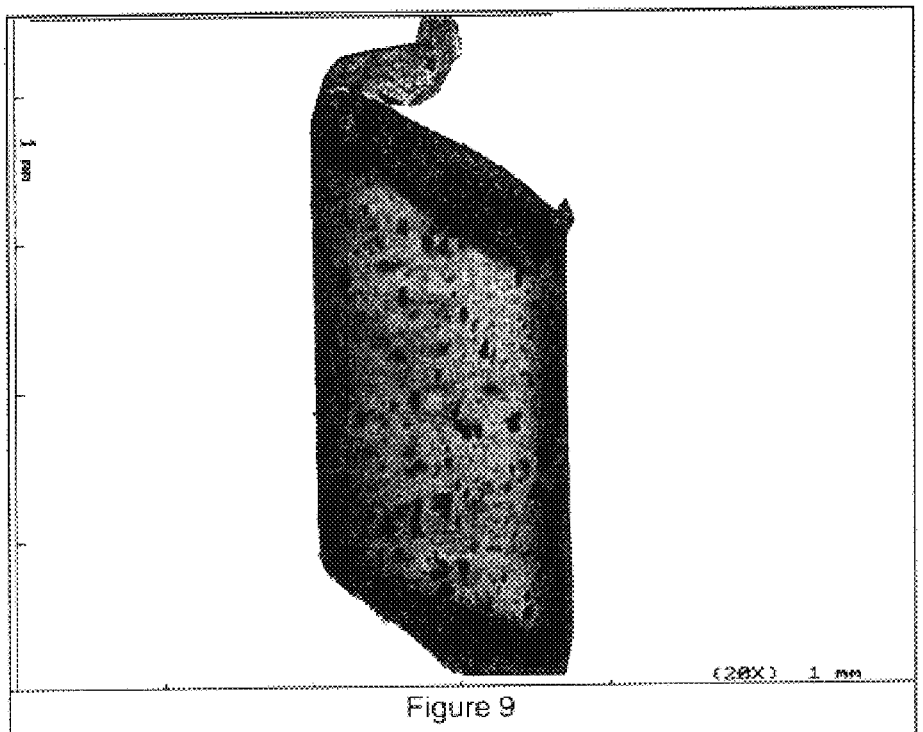
FIG. 9 is an optical micrograph at 20× of PET polyester-platelet particle composite containing 2 weight % sodium montmorillonite treated with 30 weight % PVP.
Figure 10:
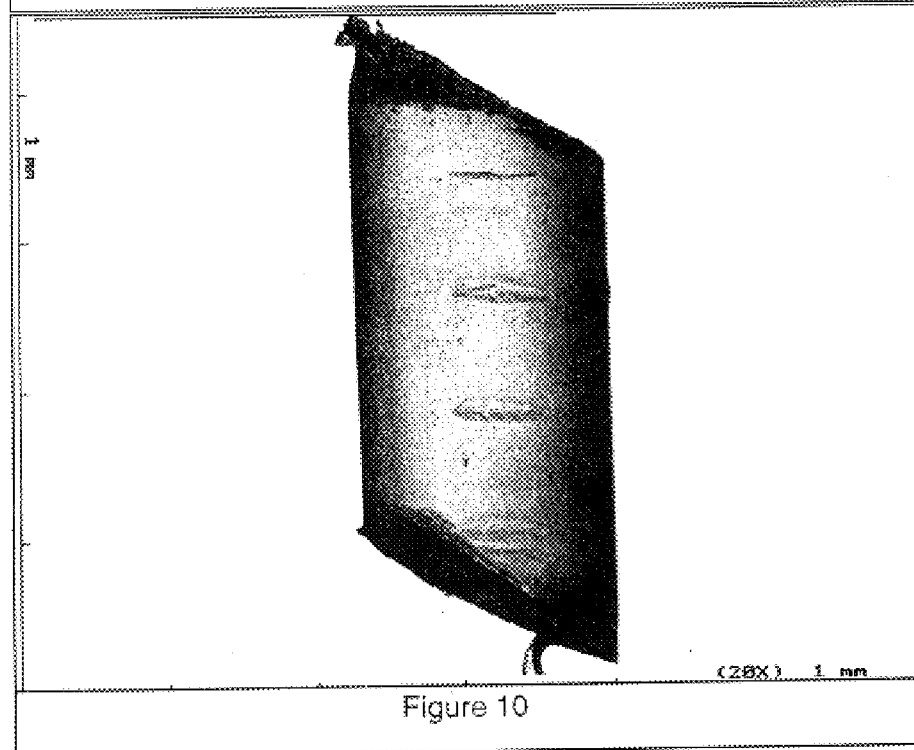
FIG. 10 is an optical micrograph at 20× of PET polyester-platelet particle composite containing 2 weight % [sodium montmorillonite treated with 30 weight % PVP] treated with 4 weight % AQ 55.

The coated pellets were placed in a convection oven at 110° C. until processed (minimum of twelve hours, maximum of twenty-four hours) by extrusion compounding. The coated pellets were extruded using a Micro-18 twin screw compounding extruder, with a high shear/mixing screw, obtaining pellets as the product. The run conditions were set at 240° C. for the first screw heating zone and 280° C. for heating zones two through eight. The RPM of the extrusion screw was maintained at 200 plus or minus five rpm. The product feed screw was set to maintain 2.5 kg/hr. The molten strand was quenched in chilled water and chopped immediately thereafter. The pellets were dried at 100° C. over night in a force air drier and extruded into film. The compounded pellets were analyzed by Optical Miscroscopy at 20× (FIG. 10) and found to exhibit improved dispersion as compared to Comparative Example 2 (FIG. 9).

Comparative Example 3 (Quaternary Ammonium Modified Montmorillonite without AQ 55)

Figure 11:
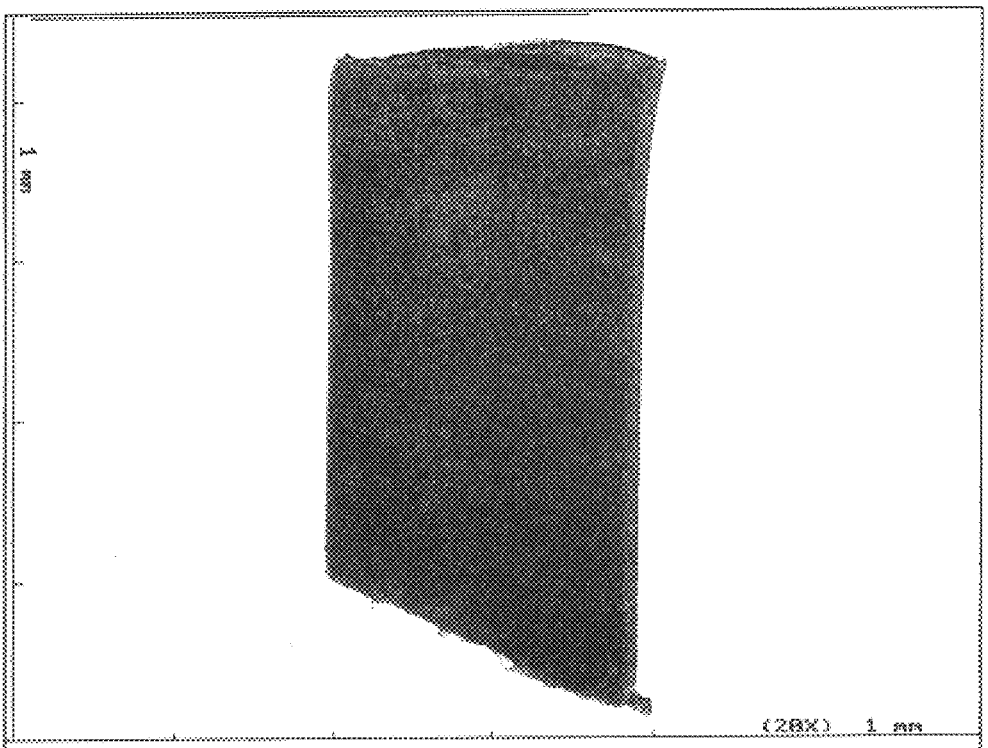
FIG. 11 is an optical micrograph at 20× of PET polyester-platelet particle composite containing 2 weight % untreated Claytone APA.
Figure 12:
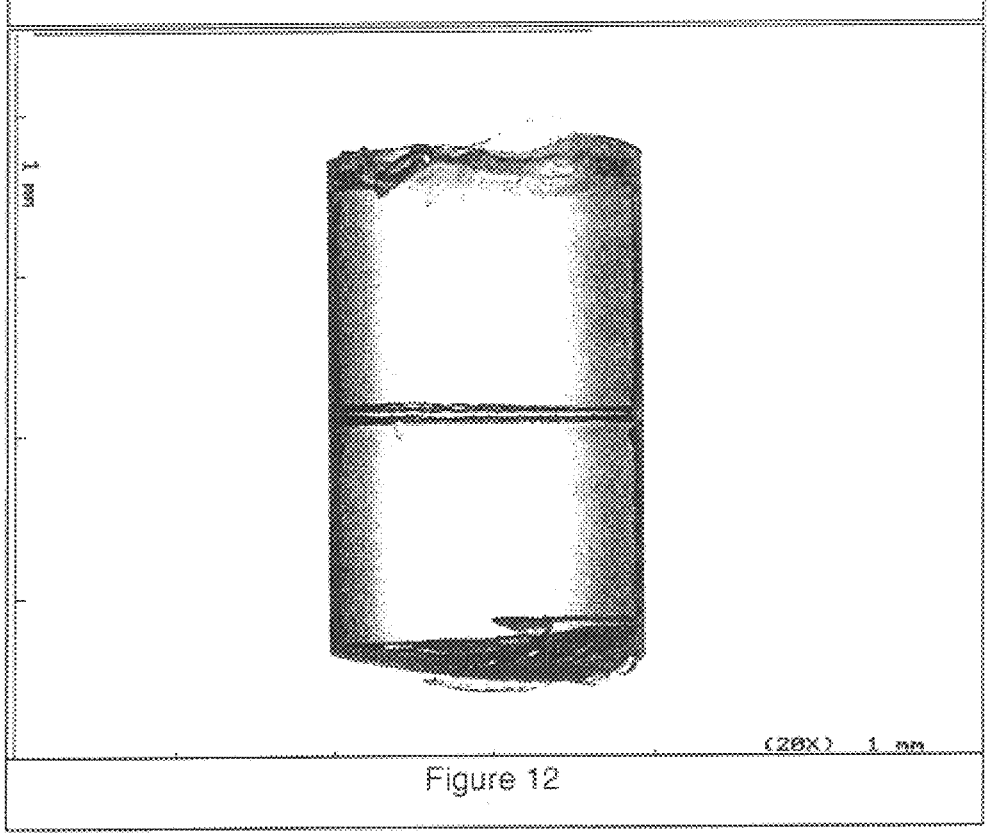
FIG. 12 is an optical micrograph at 20× of PET polyester-platelet particle composite containing 2 weight % Claytone treated with 4 weight % AQ 55.

PET pellets (9921, Eastman Chemical Company) were placed in a convection oven at 110° C. until processed (minimum of twelve hours, maximum of twenty-four hours) by extrusion compounding. The pellets were tumble-mixed with quarternary ammonium modified Montmorillonite (Claytone APA supplied by Southern Clay Products, 2 wt % silicate to PET matrix) and then melt-blended using a Micro-18 twin screw compounding extruder, with a high shear/mixing screw, obtaining pellets as the product. The run conditions were set at 240° C. for the first screw heating zone and 280° C. for heating zones two through eight. The RPM of the extrusion screw was maintained at 200 plus or minus five rpm. The product feed screw was set to maintain 2.5 kg/hr. The molten strand was quenched in chilled water and chopped immediately thereafter. The pellets were dried at 100° C. over night in a force air drier and extruded into film. The film was analyzed by Optical Miscroscopy at 20× (FIG. 11) and Transmission Electron Miscroscopy at 100, 000×, (FIG. 13) and tested for oxygen permeability. Consistent with the other examples of untreated clay materials, the film of Comparative Example 3 showed relatively poor platelet particle dispersion, with many large agglomerates containing closely spaced platelet particles. Very few individual particles or tactoids were observed.

Example 3 (Quaternary Ammonium Modified Montmorillonite with AQ 55)

An AQ 55 dispersion was made, such that, every 100 grams of dispersion contained thirty grams AQ 55 total solids by weight and seventy grams Millipore water by weight, giving a total solids in the dispersion equal to 30% by weight. A "slurry" of Millipore water and clay was made by adding forty grams (total silicate by weight) of quarternary modified Montmorillonite (Claytone APA supplied by Southern Clay Products) that had been surface modified using a H-tallow, benzyl, dimethyl ammonium chloride to 600 grams of Millipore water. The clay was dispersed with a three-blade mixer until the clay appeared to be fully wet. At this point an Ultra-Turrax 25 with the S25n-25F dispersing tool was used to input high shear mixing (18,000 rpm) for two minutes. After high shear mixing of the slurry, 266.7 grams of Eastman Chemical Company AQ55 30% dispersion was added to the slurry. Using the Ultra-Turrax 25 the water/AQ 55/clay dispersion was sheared for an additional five minutes. PET pellets (9921, Eastman Chemical Company), 1680 grams, were placed in a Sigma Blade Mixer that had been preheated to a minimum of 85° C. The water/AQ55/clay slurry was poured over the pellets and the new dispersion was mixed in the Sigma Blade mixer until the water from the dispersion had evaporated. A flow of a minimum of twenty cubic feet per hour of heated nitrogen was released over the pellets to help evacuate the water.

The coated pellets were placed in a convection oven at 110° C. until processed (minimum of twelve hours, maximum of twenty-four hours) by extrusion compounding. The coated pellets were extruded using a Micro-18 twin screw compounding extruder, with a high shear/mixing screw, obtaining pellets as the product. The run conditions were set at 240° C. for the first screw heating zone and 280° C. for heating zones two through eight. The RPM of the extrusion screw was maintained at 200 plus or minus five rpm. The product feed screw was set to maintain 2.5 kg/hr. The molten strand was quenched in chilled water and chopped immediately thereafter. The pellets were dried at 100° C. over night in a force air drier and extruded into film. The compounded pellets were analyzed by Optical Miscroscopy at 20× and Transmission Electron Microscopy at 100,000×. Both levels of magnification show very good dispersion with only tactoids and individual platelet particles present, indicating good dispersion.

Comparative Example 4 and Examples 4–8

An AQ 55 dispersion was made, such that, every 100 grams of dispersion contained thirty grams AQ 55 total solids by weight and seventy grams Millipore water by weight, giving a total solids in the dispersion equal to 30% by weight. A "slurry" of Millipore water and clay was made by adding forty grams (total silicate by weight) of Sodium Montmorillonite from Southern Clay Products to 600 grams of Millipore water. The clay was dispersed with a three-blade mixer until the clay appeared to be fully wet. At this point an Ultra-Turrax 25 with the S25n-25F dispersing tool was used to input high shear mixing (18,000 rpm) for two minutes. After high shear mixing of the slurry, 0, 133.5, 266.7, 533.4, and 933.4 grams of Eastman Chemical Company AQ55 30% dispersion was added to the. Using the Ultra-Turrax 25 the water/AQ 55/clay dispersion was sheared for an additional five minutes. PET pellets (9921, Eastman Chemical Company), 1680 grams, were placed in a Sigma Blade Mixer that had been preheated to a minimum of 85° C. The water/AQ55/clay slurry was poured over the pellets and the new dispersion was mixed in the Sigma Blade mixer until the water from the dispersion had evaporated. Pellets were coated to four concentration levels, 2, 4, 8 and 14 wt % AQ-55 (Examples 4–8, respectively). A flow of a minimum of twenty cubic feet per hour of heated nitrogen was released over the pellets to help evacuate the water. The coated pellets were placed in a convection oven at 110° C. until processed (minimum of twelve hours, maximum of twenty-four hours) by extrusion compounding using a Leistritz Micro-18 twin screw melt compounding extruder. The run conditions were set at 240° C. for the first screw heating zone and 280° C. for heating zones two through eight. The RPM of the extrusion screw was maintained at 200 plus or minus five rpm. The molten strand was quenched in chilled water and chopped immediately thereafter.

Figure 13:
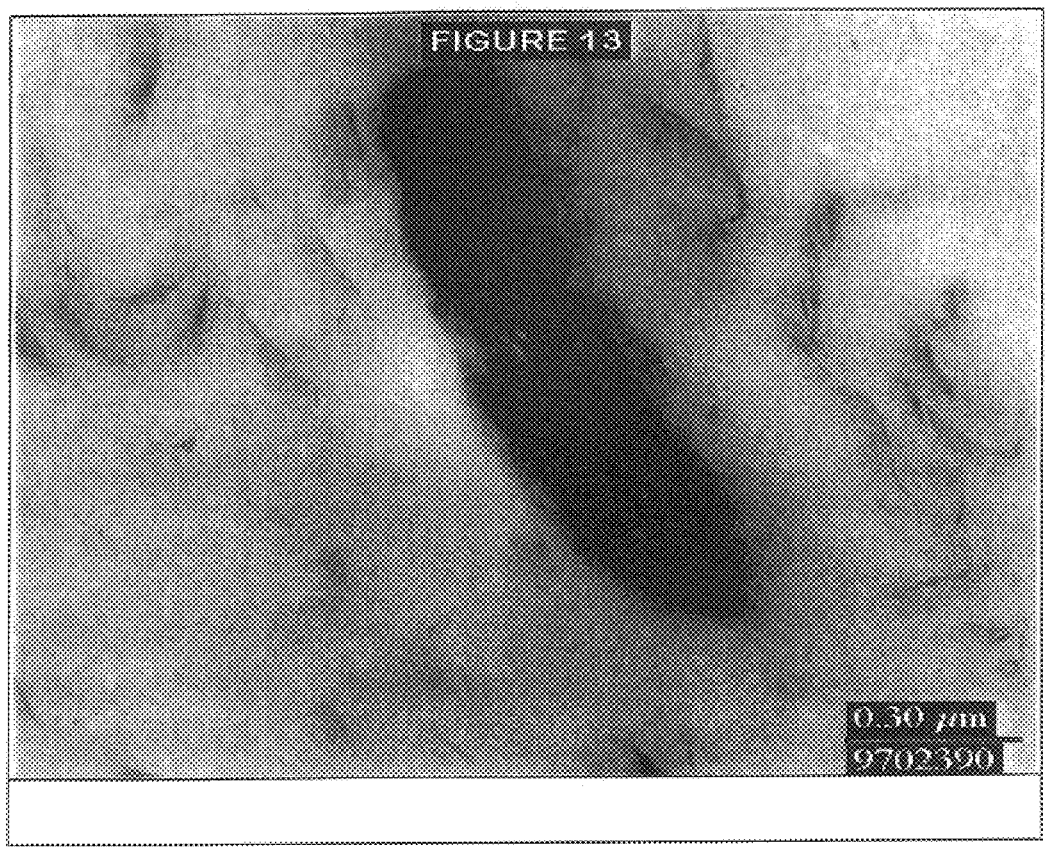
FIG. 13 is a transmission electron micrograph at 100,000× of PET polyester-platelet particle composite containing 2 weight % untreated Claytone APA.
Figures 14, 15:
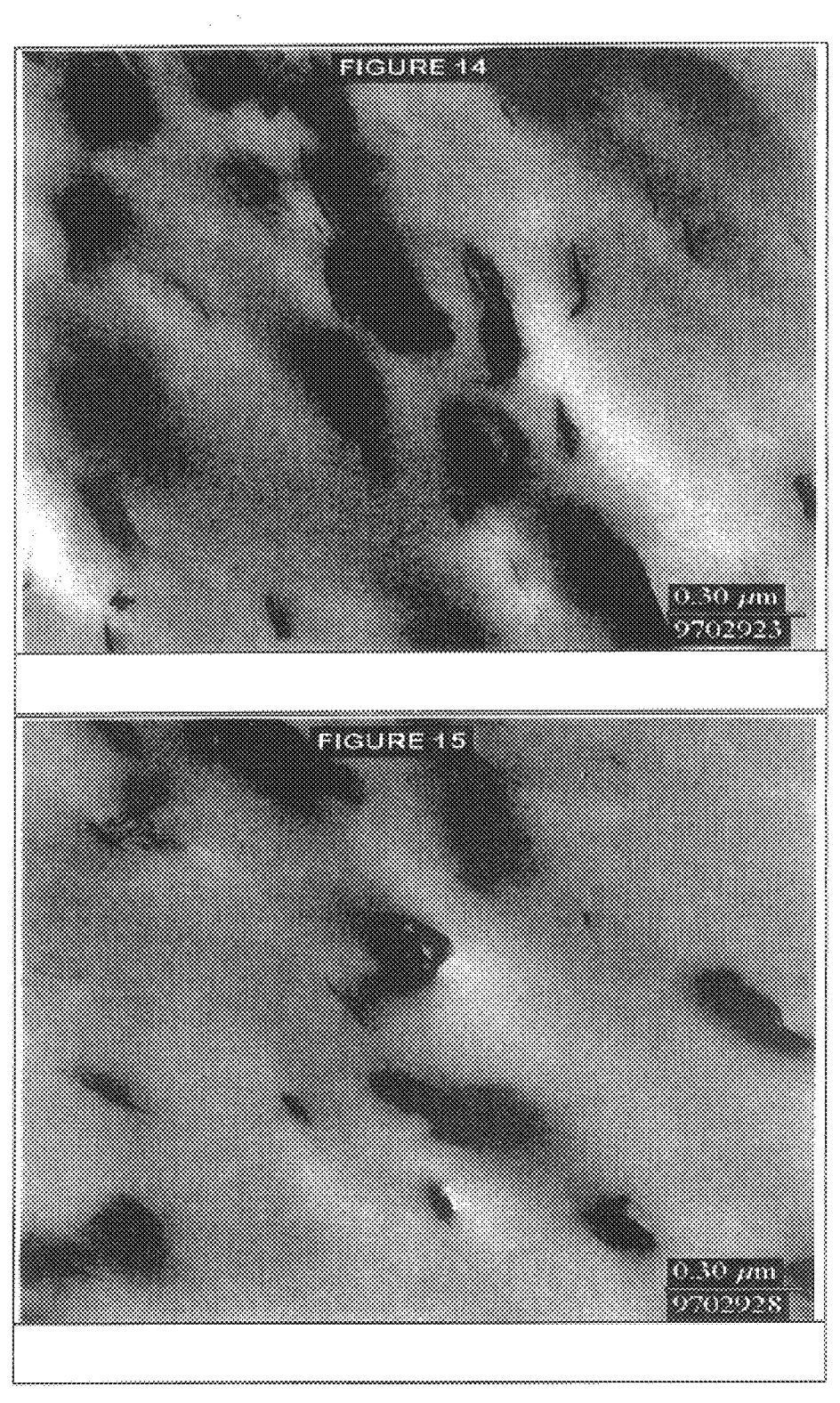
Figures 16, 17:
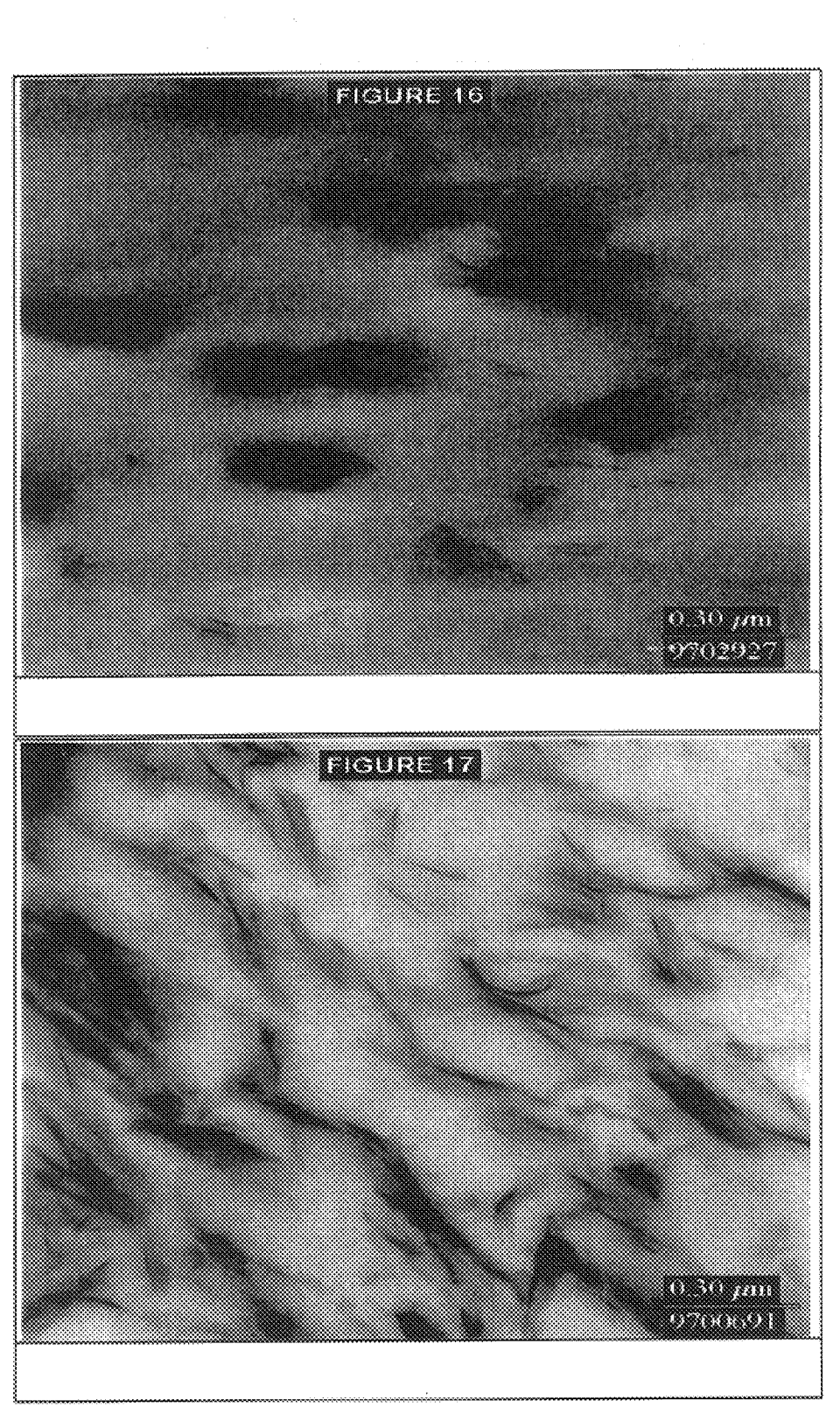

Comparing the Transmission Electron Micrographs (TEMs) of the four samples containing increasing loading of water dispersible polymer (FIGS. 14–17) to the unmodified PET (FIG. 13), the positive affect of the water dispersible polymer on platelet particle dispersion in PET is demonstrated. The PET-platelet particle composite without water dispersible polymer contains mostly very large aggregates as shown in FIG. 13. As water dispersible polymer is added in amounts increasing from 2 to 8 weight % the clay aggregates become much smaller and more swollen with polymer as shown by FIGS. 14 through 17 respectively. At about 14 weght % water dispersible polymer the composite shows excellent separation, with predominantly individual platelet particles and a few small tactoids. The dispersion shown in FIG. 17 provides a polyester-platelet particle composite with 56% lower oxygen permeability relative to unmodified PET. This result was totally unexpected. While the amount of water dispersible polymer effects the degree of platelet separation achieved, other factors such as type of clay and other additives which are used are also important.

We claim:

1. A polyester-platelet particle composite comprising: at least one polyester having dispersed therein a chalcogen or platelet particle dispersion comprising chalcogen or platelet particles and at least one water dissipatible polymer in a concentration which is at least about 1 part water dissipatible polymer to 1 part chalcogen or platelet particles, wherein said chalcogen or platelet particles primarily comprise individual chalcogen or platelet particles and tactoids.

2. The composite of claim 1 wherein said composite has a gas permeability which is at least 5% lower than that of unmodified polyester.

3. The composite of claim 1 wherein said chalcogen or platelet particles are present in an amount from about 0.01 weight % to about 25 weight %.

4. The composite of claim 1 wherein said chalcogen or platelet particles are present in an amount from about 0.5 to about 15 weight %.

5. The composite of claim 1 wherein said chalcogen or platelet particles are present in an amount from about 0.5 weight % to about 10 weight %.

6. The composite of claim 1 wherein said chalcogen or platelet particles have a thickness less than about 2 nm and a diameter from about 10 nm to about 1000 nm.

7. The composite of claim 1 wherein said water dissipatible polymer has an inherent viscosity of about 0.1 dL/g or greater.

8. The composite of claim 1 wherein said water dissipatible polymer is selected from the group consisting of sulfonate-containing, water-dispersible, linear polyesters and sulfonate-containing, water-dispersible, linear polyester-amides.

9. The composite of claim 8 wherein said water dissipatible polymer comprises residues of (1) one or more dicarboxylic acids; and (2) (i) one or more diols, or (ii) a combination of one or more diols and one or more diamines.

10. The composite of claim 9 wherein said water dissipatible polymer comprises a residue of a monomer having both acid and hydroxy functionality.

11. The composite of claim 9 wherein said residues are derived from monomer components selected from the group consisting of a dicarboxylic acid, a dialkyl ester, a bis (hydroxyalkyl) ester, an acid chloride, an anhydride, a hydroxycarboxylic acid, an aminocarboxylic acid, an aminoalcohol, a glycol, a diamine and combinations thereof; wherein at least one monomer component is poly(ethylene glycol), and at least one monomer component is substituted with one or more sulfonate metal salt groups.

12. The composite of claim 11 wherein said sulfonate group is selected from the group consisting of alkali metal sulfonic salts and substituted or unsubstituted ammonium sulfonate.

13. The composite of claim 11 wherein said sulfonate group is an alkali metal sulfonic salt selected from the group consisting of lithium, potassium and sodium sulfonate groups.

14. The composite of claim 1 wherein said water dissipatible polymer is comprised of:
   (a) diacid monomer residues comprising about 75 to 84 mole percent isophthalic acid monomer residues and about 16 to 25 mole percent 5-sodio-sulfo-isophthalic acid monomer residues or a mixture thereof; and
   (b) diol monomer residues comprising about 45 to 60 mole percent diethylene glycol monomer residues and about 40 to 55 mole percent ethylene glycol, 1,4-cyclohexanedimethanol monomer residues, or a mixture thereof.

15. The composite of claim 1 wherein said water dissipatible polymer has an inherent viscosity from about 0.28 to about 0.38 dL/g.

16. The composite of claim 1 wherein said water dissipatible polymer is present in an amount of from about 1 to about 20 parts water dissipatible polymer to 1 part chalcogen or platelet particles.

17. The composite of claim 1 wherein said water dissipatible polymer is present in an amount of from about 1 to about 10 parts water dissipatible polymer to 1 part chalcogen or platelet particles.

18. The composite of claim 1 wherein said chalcogen or platelet particles are derived from clay materials selected from the group consisting of sodium montmorillonite, sodium hectorite, bentonites, nontronite, beidelite, volonsloite, saponite, sauconite, magadiite, kenyaite, synthetic sodium hecotorites, or a mixture thereof.

19. The composite of claim 1 wherein the chalcogen or platelet particles comprise organic cations of the formula:

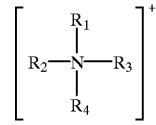

wherein M represents either nitrogen or phosphorous, and $R_1$, $R_2$, $R_3$ and R4 are each independently selected from organic or oligomeric ligands or may be hydrogen.

20. The product prepared by the process comprising the steps of dispersing a chalcogen or at least one clay material in a water dissipatible polymer to form a chalcogen or platelet particle dispersion; introducing said dispersion to a polyester and extrusion mixing said dispersion and polyester to form a chalcogen or platelet particle-polyester composite composition wherein said platelet particles primarily comprise chalcogen or platelet particles and tactoids.

* * * * *

UNITED STATES PATENT AND TRADEMARK OFFICE
CERTIFICATE OF CORRECTION

PATENT NO.    : 6,359,052 B1
DATED         : March 19, 2002
INVENTOR(S)   : Trexler et al.

It is certified that error appears in the above-identified patent and that said Letters Patent is hereby corrected as shown below:

<u>Title page,</u>
Item [56], References Cited, OTHER PUBLICATIONS, under Sugahara et al., please correct "Compositie" to read: -- Composite: --

<u>Column 18,</u>
Line 16, please correct "R4" to read -- $R_4$ --

Signed and Sealed this

Eighth Day of October, 2002

*Attest:*

*Attesting Officer*

JAMES E. ROGAN
*Director of the United States Patent and Trademark Office*